United States Patent [19]

Cooper

[11] Patent Number: 5,218,792
[45] Date of Patent: Jun. 15, 1993

[54] MOTOR HOME OR TRAILER BODY CONSTRUCTIONS

[75] Inventor: Denzil R. Cooper, Nuevo, Calif.

[73] Assignee: Fleetwood Enterprises, Inc., Riverside, Calif.

[21] Appl. No.: 669,924

[22] Filed: Mar. 15, 1991

[51] Int. Cl.$^5$ ............................................. B61D 17/12
[52] U.S. Cl. .......................................... 52/46; 52/281; 52/284; 52/309.9; 296/203; 296/205; 296/210; 296/29
[58] Field of Search ................. 52/245, 246, 288, 46, 52/588, 281, 284, 730, 731, 143, 309.4, 309.8, 309.9; 296/203, 205, 210, 29, 39.3

[56] References Cited

U.S. PATENT DOCUMENTS

| | | | |
|---|---|---|---|
| 2,036,555 | 4/1936 | Thompson et al. | 296/210 X |
| 2,205,640 | 6/1940 | Wendt | 296/210 |
| 2,214,244 | 9/1940 | Duryea . | |
| 2,235,662 | 3/1941 | Arehart . | |
| 2,460,982 | 2/1949 | Gilpin | 52/732 |
| 2,489,670 | 11/1949 | Powell, Jr. . | |
| 2,585,976 | 2/1952 | Teeter . | |
| 2,730,772 | 1/1956 | Jones | 52/309.9 X |
| 3,481,642 | 12/1969 | Bonallack et al. | 52/309.9 X |
| 3,712,005 | 1/1973 | Eschbach et al. | 52/585 X |
| 3,944,008 | 3/1976 | Moore | 296/205 X |
| 4,403,804 | 9/1983 | Mountz et al. . | |
| 4,424,650 | 1/1984 | Van Note | 52/309.8 X |
| 4,471,591 | 9/1984 | Jamison | 52/309.9 |
| 4,662,138 | 5/1987 | Bryant | 52/282 |
| 4,858,398 | 8/1989 | Ricchini | 52/288 X |
| 4,986,596 | 1/1991 | Gohier | 296/203 |
| 5,042,395 | 8/1991 | Wackerle et al. | 52/282 X |

FOREIGN PATENT DOCUMENTS 612291  1/1961  Canada .............................. 296/210

Primary Examiner—Richard E. Chilcot, Jr.
Assistant Examiner—Lan M. Mai
Attorney, Agent, or Firm—Price, Gess & Ubell

[57] ABSTRACT

An improved mobile housing structure is provided having a pair of side walls with a plurality of vertical support posts extending upward from a chassis. The vertical support posts are connected to an elongated side wall joint member of a honeycomb configuration. A modular roof section having a plurality of roof support members extending between a pair of roof joint members is formed of a sandwich construction with styrofoam block members adhesively connected to overlapping panels. The roof joint members can be riveted to the side joint members to provide an extremely lightweight and rigid structure that can resist transportational torque stresses.

37 Claims, 4 Drawing Sheets

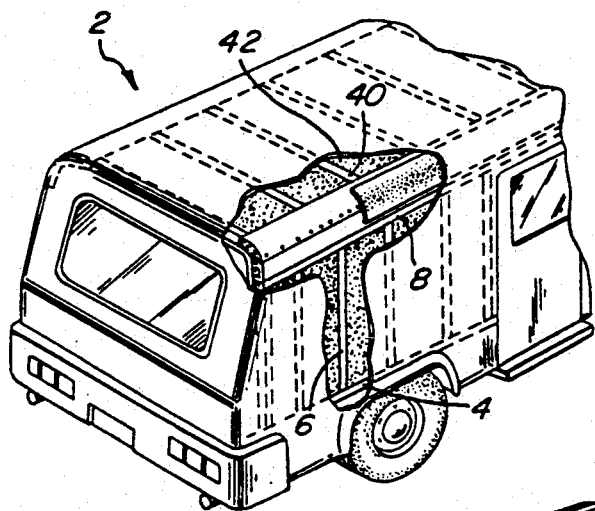
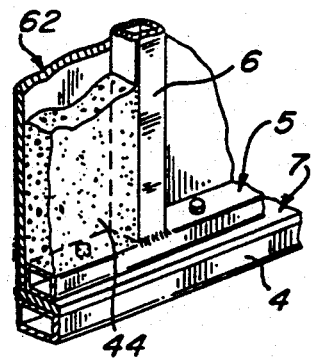
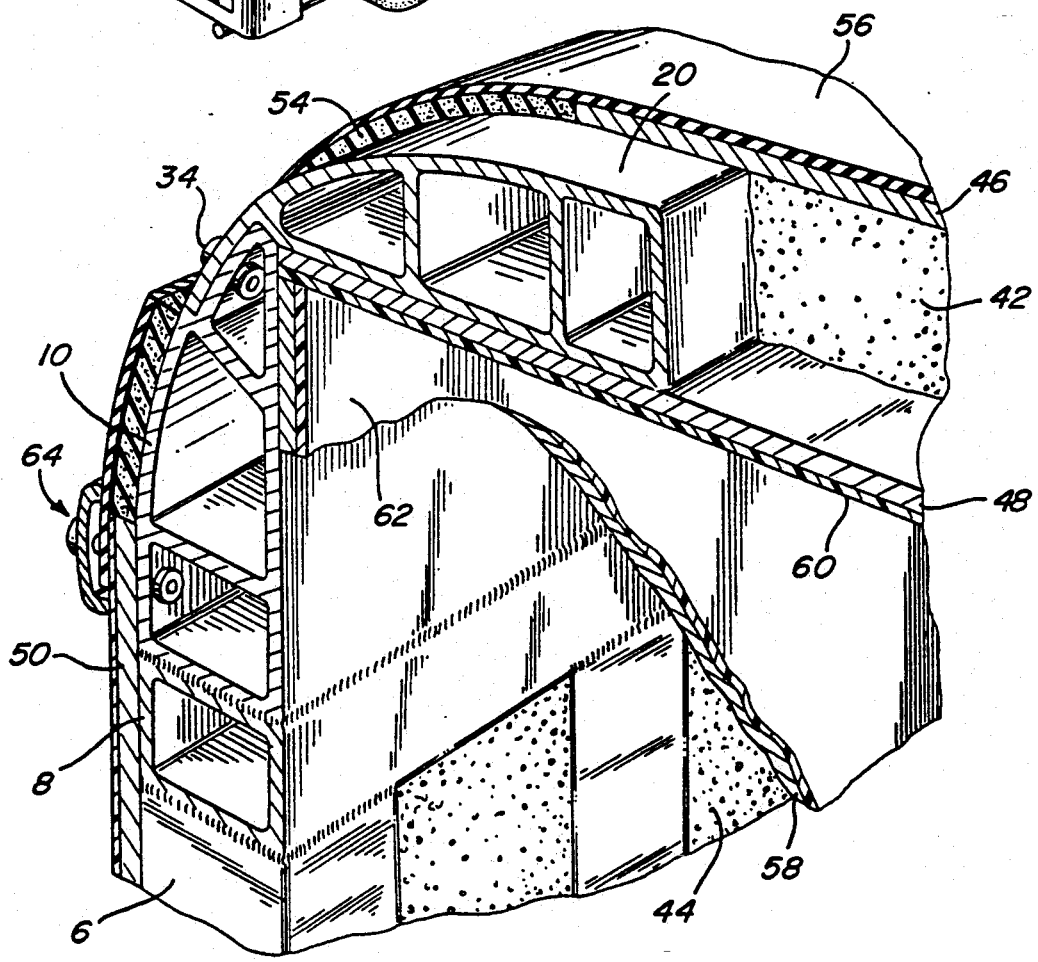

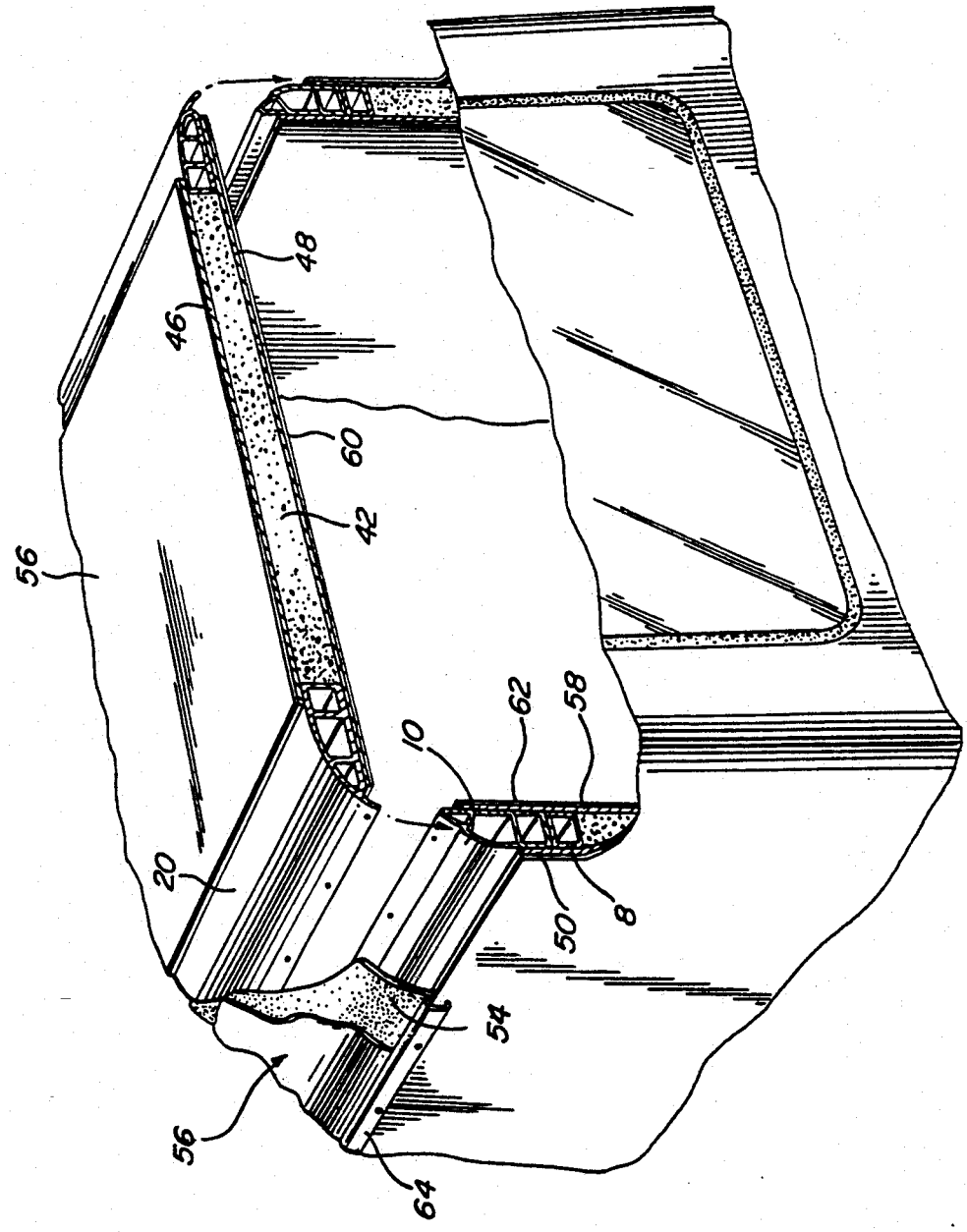

MOTOR HOME OR TRAILER BODY CONSTRUCTIONS

BACKGROUND OF THE INVENTION

1. Field of the Invention

The present invention relates to construction features of a motor home or trailer and, more particularly, to a frame joint system and the component parts of the side walls and roof.

2. Description of Related Art

In the motor home and home trailer industry, a chassis or frame member will support constructed side walls, roof, and end walls to form the shell of either a motor home or trailer unit. Frequently the frame and joints of such constructions are formed of wood beams and plywood with fiberglass or molded plastic exteriors. Such constructions are relatively labor intensive, do not always provide a uniformity of product, and are subject to transportation flexing problems over the life of the product.

Problems of water leakage have also frequently occurred in motor homes, along with the stress torquing of mobile structures.

Attempts have been made in the prior art to permit a relatively modular approach to manufacturing of vehicle bodies, as disclosed, for example, in U.S. Pat. Nos. 2,585,976, 2,235,662, and 2,214,244. The ability to connect or join side walls and roofing structures in truck or trailer body configurations is also disclosed in U.S. Pat. Nos. 2,489,670 and 4,403,804.

Finally, since motor homes and trailers are becoming increasingly more complex, in attempts to satisfy the desires of the purchasing public to enjoy all the comforts of static homes, there has also been a desire to lighten the road weight of such mobile products. Thus, the prior art in the field of motor home and trailer construction is still seeking to optimize their construction component parts and the ability to join these construction component parts in an efficient and repeatable manner during manufacture.

SUMMARY OF THE INVENTION

The present invention provides an improved mobile body construction in the field of motor homes and trailers having relatively rigid side walls and roofs mounted above a chassis frame. A frame joint system is provided through use of metallic extruded joint members of a lightweight configuration, while maintaining a relatively rigid frame. These joint members are elongated and can be cut to the individual needs of the particular unit under construction, and comprise a hollow interior subdivided into strengthening polygonal cells. A side wall joint member will include a complementary interfacing section adjacent one end, which can be joined with a roof joint member having a complementary coupling interface section. The locking interface sections can comprise force supporting abutting shoulders with a recess formed on one hollow joint member to receive an overlapping flange from the other joint member. The exterior surfaces of the joint members form a curvilinear structure to permit a rounded connection between the side wall and the roof.

A plurality of vertical support posts, also formed of a metallic material such as aluminum, can extend upward from a lower horizontal support member secured to the chassis frame and can receive an upper horizontal support member. A side wall joint member can be welded to the upper horizontal support member and can, in turn, be connected, for example, by riveting to the roof joint member. The roof section will have a pair of roof joint members and will also include horizontal roof support members. Lightweight insulating material such as foam blocks can be positioned between both the vertical support posts and the roof support members to provide both insulation and additional rigidity and strength. Both the roof section and side walls can be covered with exterior surfaces that can also be conveniently secured to the joint structure. Plywood and fiberglass panels can be adhesively bonded to the roof section and side walls to provide a sandwich construction of superior strength.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a partial side perspective view having a cutaway section of the present invention;

FIG. 2 is a cross-sectional side perspective view with a cutaway section showing the construction features of the present invention;

FIG. 5 is an exploded partial cross-sectional view of the roof section of the present invention;

FIG. 6 is a partial cross-sectional view of the frame and vertical support posts.

DESCRIPTION OF THE PREFERRED EMBODIMENTS

Figure 3:
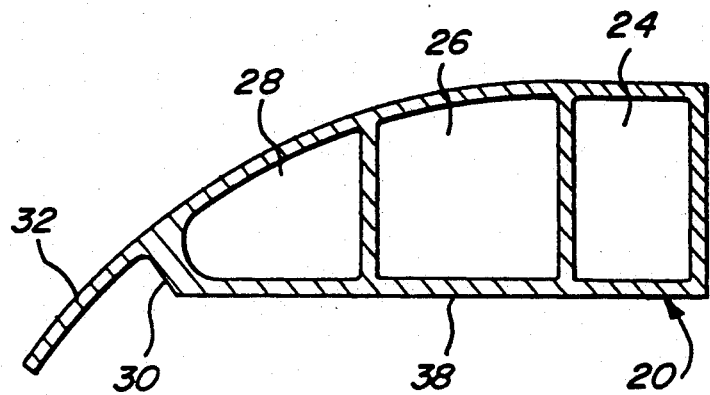
FIG. 3 is a cross-sectional view of the roof joint member.

The following description is provided to enable any person skilled in the motor home and trailer industry to make and use the invention and sets forth the best modes contemplated by the inventor of carrying out his invention. Various modifications, however, will remain readily apparent to those skilled in this field, since the generic principles of the present invention have been defined herein specifically to provide a relatively easily manufactured and lightweight mobile body construction.

Referring to FIGS. 1 and 2, a motor home 2, for example, having a self-contained engine, is illustrated. A chassis frame 4, shown in FIG. 6, supports an axle and wheel assembly and, in a motor home, can also support an engine and drive shaft, is utilized as the starting point for a mobile body construction. Generally, the manufacturer will purchase the chassis frame 4 and will then construct the motor home or trailer body on that frame. A plurality of supporting vertical side support posts 6, for example, of an extruded aluminum hollow square configuration, can be joined to the chassis frame 4, or even to an intermediate structure such as a lower horizontal support member 5, to form the lattice work for the side walls. The lower horizontal support member 5 can be bolted to the frame 4 through a floor 7 and can be welded to the support posts 6. An upper horizontal support member 8, also, for example, of a square hollow cross-sectional post configuration, can be welded onto the top edges of the vertical side support posts 6. An elongated hollow side joint member 10 can be welded on top of the support member 8.

Figure 4:
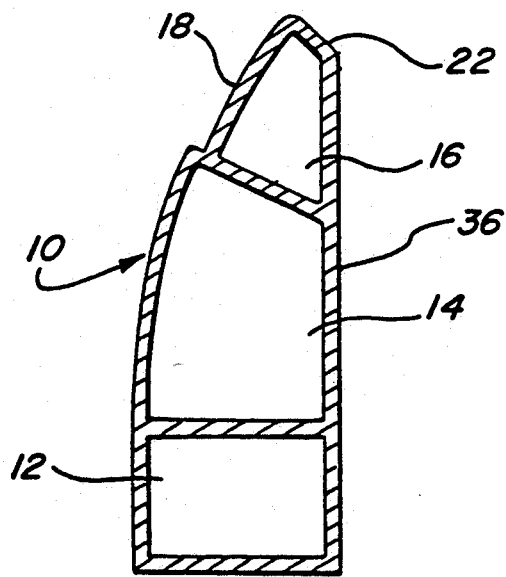
FIG. 4 is a cross-sectional view of the side wall joint member.

The side joint member 10 has a hollow honeycombed interior and is a metal extrusion from aluminum stock. As can be seen in FIG. 4, three cross-sectional polygonal cells reside within the hollow exterior of the joint member 10. The first cell 12 has a rectangular configuration. The second cell 14 is a curvilinear polygon cell with an outside exterior surface forming a portion of a cylindrical surface. Another curvilinear polygonal cell 16 is at one end of the side joint member 10, and is recessed on its curvilinear surface relative to the curvilinear polygonal cell 14. This exterior recess section 18 provides a coupling interfacing section for joining with an elongated hollow roof joint member 20. The exterior surface of the polygonal cell 16 comprises a load bearing abutting shoulder 22.

The side joint member 10 is relatively lightweight, but provides a very strong rigid frame component in which to construct a rigid side wall that will resist transportation torque stresses.

The roof joint member 20 also has three polygonal cross-sectional cells 24, 26, and 28. The polygonal cells 26 and 28 are also curvilinear, and have an outside surface or an exterior surface of a cylindrical configuration complementary to that of the side joint member 10. At one end of the roof joint member 20 is an abutting load bearing shoulder 30 which has a size complementary to the abutting shoulder 22 of the side wall joint member 10. Adjacent the abutting shoulder 30 is a flange 32 of a curvilinear configuration to provide an interfacing section with the recess 18 of the side joint member 10. As seen in FIG. 2, a rivet 34 can be utilized to join the respective joint members to form a frame joint system. The interior surface 36 of the side joint member 10 and the interior surface 38 of the roof joint member 20 are flat planar structures that come together in roughly a 90-degree joint.

As seen in FIG. 1, roof support members 40 can be welded between a pair of roof joint members 20 to form the lattice work of a roof structure. Blocks of bead board styrofoam 42 can add additional rigidity and insulation to the roof structure. This roof member can be manufactured separately and then appropriately joined by rivets through the coupling interface sections on each of the joint members. Additional styrofoam panels or blocks 44 can be inserted between each of the vertical support posts 6.

The roof structure can also include an upper plywood member of approximately 5/32-inch in thickness, and a lower plywood panel of 5/32-inch in thickness, sandwiching the styrofoam bead board 42 and roof support members 40 and extending over each of the respective roof joint members 20.

A urethane adhesive is spread over each of the entire plywood panels 46 and 48 to provide a unitary lightweight and rigid roof panel section. As can be appreciated, one or more roof panel sections can then be easily connected to side walls through the frame joint system of the present invention. Once joined together, a relatively strong and rigid box configuration is established on the chassis frame to resist torsion stresses during transportation.

On the exterior of the side walls, a 5/32-inch plywood panel 50 can be glued to the side support posts 6 and styrofoam boards 42. Sandwiched over the plywood panel 50 is a fiberglass panel 52, for example, of 8 oz./sq. ft.

Covering the frame joint system of the side joint member 10 and the roof member 20 is a nylon foam or felt pad 54 which extends between the respective side plywood panel 50 and the upper roof plywood panel 46. A waterproof flexible roof material such as rubber 56 extend over the entire roof section and the frame joint system, and can overlap the side fiberglass panels 52. A decorative aluminum molding member 64 can be riveted through a side joint member 10 to lock the exterior surface components together, as seen in FIG. 5.

The interior of the mobile model construction includes an interior side plywood panel 58 that can be attached by respective fastening means to the side structure. Interior decorative panels such as fiberglass and/or vinyl clad panels 60 and 62 can be used to complete the interior of the mobile body construction.

Figure 7:
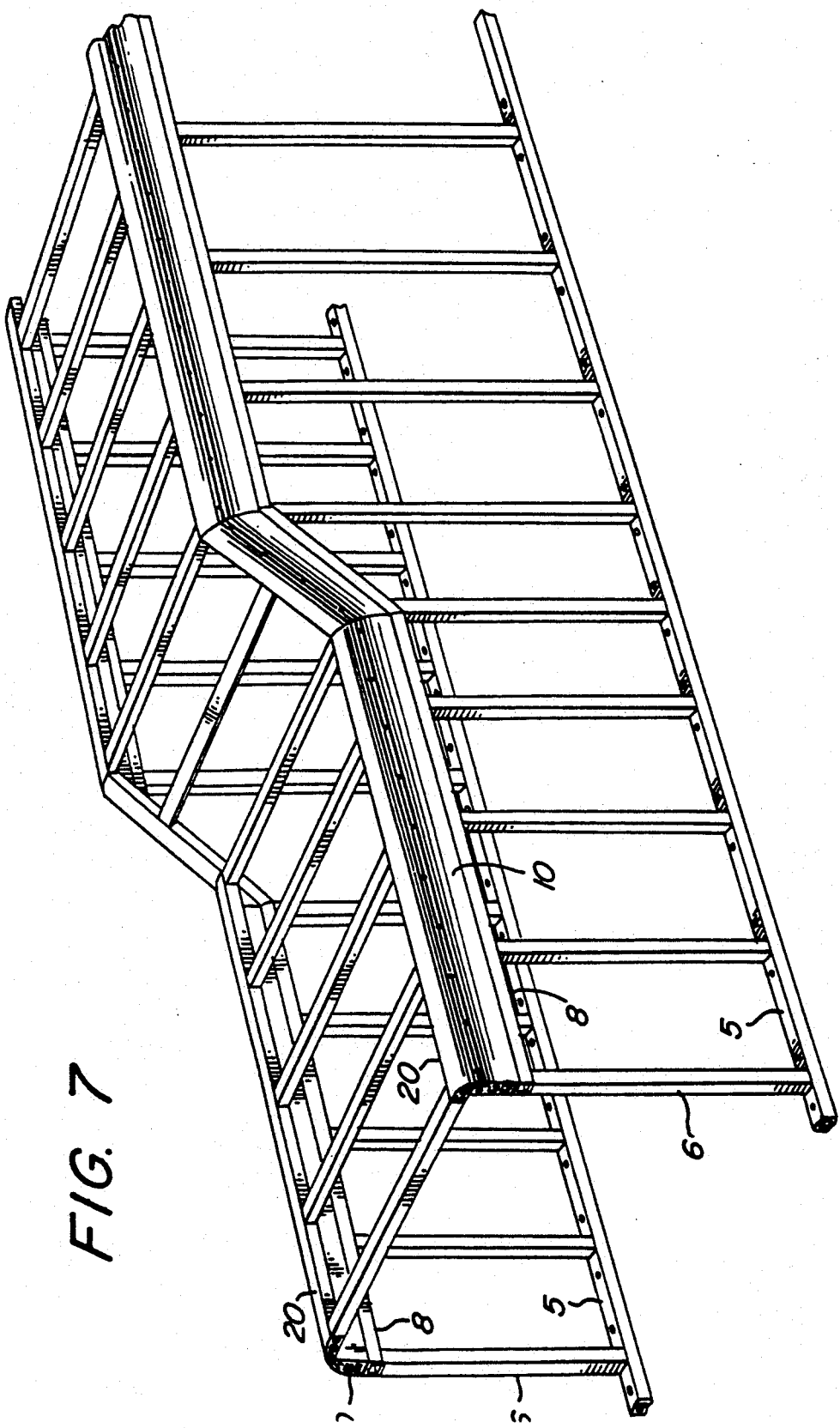
FIG. 7 is a perspective view of a frame assembly for a fifth wheel trailer.

As seen in FIG. 7, the use of the frame joint system of the present invention comprising elongated extruded aluminum joint members can be advantageously cut to accommodate the dual or two-tier level of a fifth wheel trailer. Thus, through the use of relatively lightweight extruded aluminum joint members that are honeycombed with polygonal cells to provide additional strength, an improved construction method can be accomplished that is relatively lightweight and rigid, while providing precise reproducible manufacturing steps.

Those skilled in the art will appreciate that the above-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. In a mobile body construction having side walls and a roof, the improvement of a joint system comprising;
   a first elongated hollow joint member having extended interior parallel partitions and a recessed coupling interface section and
   a second elongated hollow joint member having extended interior parallel partitions and a complementary interface section extending over the first recessed coupling interface section, each interface section terminates at an abutting shoulder of a dimension to transmit the load of the roof to a side wall when the respective shoulders are abutted together, whereby the connection of the respective joint members through their interface sections provides a supporting joint connection between the roof and a side wall.

2. The invention of claim 1 wherein each hollow joint member is a metal extrusion.

3. The invention of claim 2 wherein each joint member is formed of aluminum.

4. The invention of claim 1 wherein an outside surface of the first and second hollow joint members has a common radius defining a curvilinear joint surface.

5. The invention of claim 4 wherein an interior hollow portion of each joint member is divided into a series of elongated cells extending along each joint member.

6. The invention of claim 5 wherein the hollow joint members comprise at least two cross-sectional polygonal cells.

7. The invention of claim 6 further including a cross-sectional curvilinear polygonal cell.

8. The invention of claim 7 wherein one of the polygonal cells has an approximately triangular cross-section in each joint member.

9. The invention of claim 7 wherein each joint member is formed of aluminum.

10. The invention of claim 7 wherein the respective joint members include respective abutting shoulders positioned adjacent a respective recess on one joint member and an overlapping flange on the other joint member, the flange extending into the recess.

11. The invention of claim 1 wherein each hollow joint member comprises at lest two cross-sectional polygonal cells having internal chambers, with one chamber being a curvilinear polygonal cell.

12. The invention of claim 1 wherein each joint member has an outside surface and an inside surface and the outside surface of each joint member is nonlinear and the inside surface is flat.

13. The invention of claim 12 wherein an interior hollow portion of each joint member is divided into a series of elongated cells extending along each joint member.

14. The invention of claim 1 wherein an interior hollow portion of each joint member is divided into a series of elongated cells extending along each joint member.

15. In a mobile housing structure having side walls and a roof section supported above a chassis, the improvement of a complete frame and housing structure comprising;
a pair of side walls having a plurality of vertical support posts extending upward from the chassis;
a pair of elongated hollow side wall joint members having extended interior parallel partitions to form a honey combed interior and connected respectively to the vertical support posts on a side wall;
a pair of elongated hollow roof joint members having extended interior partitions to form a honey combed interior and connected respectively to a side wall joint member;
roof support members extending between the roof joint members;
a lightweight insulating material positioned between the vertical support posts and the roof support members to provide additional strength, and
an exterior cover means extending over the side walls and roof, wherein each side wall joint member and roof joint member further include respective load bearing abutting shoulders positioned adjacent a respective recess on one joint member and an overlapping flange on the other joint member, the flange extending into the recess.

16. The invention of claim 15 wherein each joint member has an exterior surface which is curvilinear.

17. The invention of claim 16 wherein the joint members are joined together at a position intermediate of the curvilinear surface.

18. The invention of claim 15 wherein the exterior cover means includes a rubber roof cover.

19. The invention of claim 18 wherein the exterior cover means includes a fiberglass panel.

20. The invention of claim 19 further including fastening means including an elongated member for securing the rubber roof and fiberglass panel to one of the joint members.

21. The invention of claim 20 further including a cross-sectional curvilinear polygonal cell.

22. The invention of claim 21 wherein one of the polygonal cells has an approximately triangular cross-section in each joint member.

23. The invention of claim 22 wherein each joint member is formed of aluminum.

24. The invention of claim 23 wherein an outside surface of the first and second hollow joint members has a common radius defining a curvilinear joint surface.

25. The invention of claim 23 wherein an outside surface of each joint member is nonlinear and an inside surface is flat.

26. The invention of claim 23 wherein each joint member is formed of aluminum.

27. The invention of claim 26 further including a cross-sectional curvilinear polygonal cell.

28. The invention of claim 23 wherein each hollow joint member comprises at least two cross-sectional polygonal cells.

29. The invention of claim 28 wherein one of the polygonal cells has an approximately triangular cross-section in each joint member.

30. The invention of claim 15 further including a resilient pad mounted over the joint member.

31. The invention of claim 15 further including a first plywood member extending across a side wall and a portion of the side wall joint member and a second plywood member extending across the roof section and a portion of the roof joint member.

32. The invention of claim 15 further including a horizontal support member welded to the vertical support posts and welded to the side wall joint members.

33. The invention of claim 15 further including flat panel members adhered to the interior and exterior side walls and an interior and exterior surface of the roof section to provide a rigid and lightweight construction.

34. The invention of claim 15 wherein the hollow joint members and vertical support posts are metal extrusions.

35. The invention of claim 15 wherein the hollow joint member comprises at least two cross-sectional polygonal cells with one polygonal cell having an interior curvilinear configuration.

36. The invention of claim 35 wherein an interior hollow portion of each joint member is divided into a series of elongated cells extending across each joint member.

37. In a mobile body construction having side walls and a roof, the improvement of a joint system comprising:
a first elongated hollow metallic joint member having a plurality of elongated parallel cells within its hollow recess;
a second elongated hollow metallic joint member having a plurality of elongated parallel cells within its hollow recess; and
means for interconnecting the joint members, including a first abutting shoulder on one joint member adjacent a curved recess portion and a second abutting shoulder on the other joint member adjacent an overlapping curved flange, the flange being in sandwiched contact with the recess portion and of a thickness to fill the recess, whereby the connection of the respective joint members provides a joint connection between the roof and a side wall as a continuous smooth curved surface between the side wall and roof.

* * * * *